United States Patent [19]

Schneider

[11] Patent Number: 4,533,022
[45] Date of Patent: Aug. 6, 1985

[54] HYDRAULICALLY OPERABLE BRAKE, IN PARTICULAR, A SERVO BRAKE

[75] Inventor: Wilhelm Schneider, Mannheim, Fed. Rep. of Germany

[73] Assignee: Deutsche Perrot-Bremse GmbH, Mannheim, Fed. Rep. of Germany

[21] Appl. No.: 541,073

[22] Filed: Oct. 12, 1983

[30] Foreign Application Priority Data

Oct. 25, 1982 [DE] Fed. Rep. of Germany ....... 3239455

[51] Int. Cl.³ .............................................. F16D 65/02
[52] U.S. Cl. ............................ 188/18 R; 188/79.5 R; 188/363
[58] Field of Search ................... 188/18 R, 17, 205 R, 188/205 A, 206 R, 206 A, 250 F, 79.5, 78, 325-343, 361-370, 140 A, 218

[56] References Cited

U.S. PATENT DOCUMENTS 3,712,425 1/1973 Torii et al. ................. 188/79.5 GE
4,026,394 5/1977 Wright .................... 188/331

Primary Examiner—Douglas C. Butler
Attorney, Agent, or Firm—Dressler, Goldsmith, Shore, Sutker & Milnamow, Ltd.

[57] ABSTRACT

The invention relates to a hydraulically operable brake, in particular, a servo brake, with a brake carrier arranged secure against turning on the vehicle, a wheel cylinder fastened to the circumferential zone of the brake carrier, which wheel cylinder is connected over hydraulic lines with a pressure medium source, an automatic resetting device fastened to the circumferential zone of the brake carrier lying opposite the wheel cylinder, a brake-jaw bracing angle piece fastened to the brake carrier, two brake jaws, the oppositely lying ends of which abut on the piston of the wheel cylinder and on the threaded bolts of the readjusting device, and with restoring springs that engage on the brake jaws and on the brake carrier. So that such a brake is suited for installation into a vehicle under specially cramped space relations, the invention provides that the brake carrier is formed by an axial gear cover which is provided with arrangements for the fastening of the wheel cylinder of the brake jaws and of the readjusting device.

9 Claims, 6 Drawing Figures

4,533,022

HYDRAULICALLY OPERABLE BRAKE, IN PARTICULAR, A SERVO BRAKE

The invention relates to a hydraulically operable brake, in particular, a servo brake, with a brake carrier arranged secure against turning on the vehicle, a wheel cylinder fastened to the circumferential zone of the brake carrier, which wheel cylinder is connected over hydraulic lines with a pressure medium source, an automatic resetting arrangement fastened to the circumferential zone of the brake carrier lying opposite the wheel cylinder, a brake jaw supporting an angle piece fastened to the brake carrier, two brake jaws, the oppositely lying ends of which abut on the piston of the wheel cylinder and on the threaded bolt of the readjusting arrangement, and with restoring springs which engage on the brake jaws and on the brake carrier.

In certain vehicles, such as, for example, stacking vehicles, the installation space is cramped in such a way that hydraulically operable brakes of the type mentioned above cannot be used in mass production. So that the installation of a brake according to the category is nevertheless possible under the cramped space relations, there is required an enormous expenditure in construction for the modification of the individual parts in order to arrive at a brake capable of functioning.

Underlying the invention is the problem of further developing the brake according to the category in such a way that with a relatively low expenditure in construction it is suited for installation in vehicles in which only a very small installation space is available in the axial direction.

According to the invention this problem is solved by the means that the brake carrier is formed by an axial gear cover which is provided with arrangements for the fastening of the wheel cylinder of the brake jaws and of the readjusting arrangement.

Through the construction according to the invention of the axial gear cover, the installation space required in axial direction is considerably shortened.

So that the wheel cylinder can be fastened to the axial gear cover from the outside, this cover is preferably provided with two threaded bores which are aligned with two bores disposed in the wheel cylinder, through which screws can be screwed from the outside into the threaded bores.

So that the screws do not project beyond the wheel cylinder, it is expedient that the bores arranged in the wheel cylinder are arranged outside the wheel cylinder axis in respect to the brake center.

The brake jaw supporting angle piece is preferably integrated with the axial gear cover and divided in the middle in order to form a free space receiving the hydraulic lines, so that the hydraulic lines are arranged sunk in the axial gear cover and do not project beyond the wheel cylinder on the outside.

The hydraulic lines are expediently screwed together with tube nuts which are springably borne in the circumferential flange of the axial gear cover, so that no vibrations are transferred to the pressure medium lines leading to the pressure medium source. In practice, this can be brought about by the means that the tube nuts are installed in bores of the circumferential flange of the axial gear cover with the interposition of O-rings with play.

Expediently, holding pins are arranged on the axial gear cover, on which draw springs are suspendable, which engage on the brake jaws. For this purpose, the strap of the brake jaw can be provided with an opening through which there extends the draw spring abutting on the outside of the strap.

In the interest of a space-saving fastening of the readjusting arrangement, it is provided that the axial gear cover is provided with the fastening zone of the readjusting arrangement with a pocket open toward its circumferential surface, the upper side of which pocket is covered by a bridge, and that in the bridge there is arranged a radial slit open toward the circumferential surface of the axial gear cover, so that a fastening screw screwed into the readjusting arrangement is bringable into engagement with the bridge, as the screw head is moved in the pocket and the screw shaft is moved in the slit radially inward. The space requirement needed for the installation of the readjusting arrangement in the axial direction, therefore, is very slight.

In order to bring about a closed-linkage connection of the readjusting arrangement with the axial gear cover, it is provided that the readjusting arrangement is provided with a slide piece, and that the bridge is provided on the outside with a tangential groove receiving the slide piece in closed linkage.

Further details, advantages, and features of the invention are yielded from the following specification and the drawings, to which reference is made expicitly in regard to the disclosure of all details not described in the text.

Figure 1:
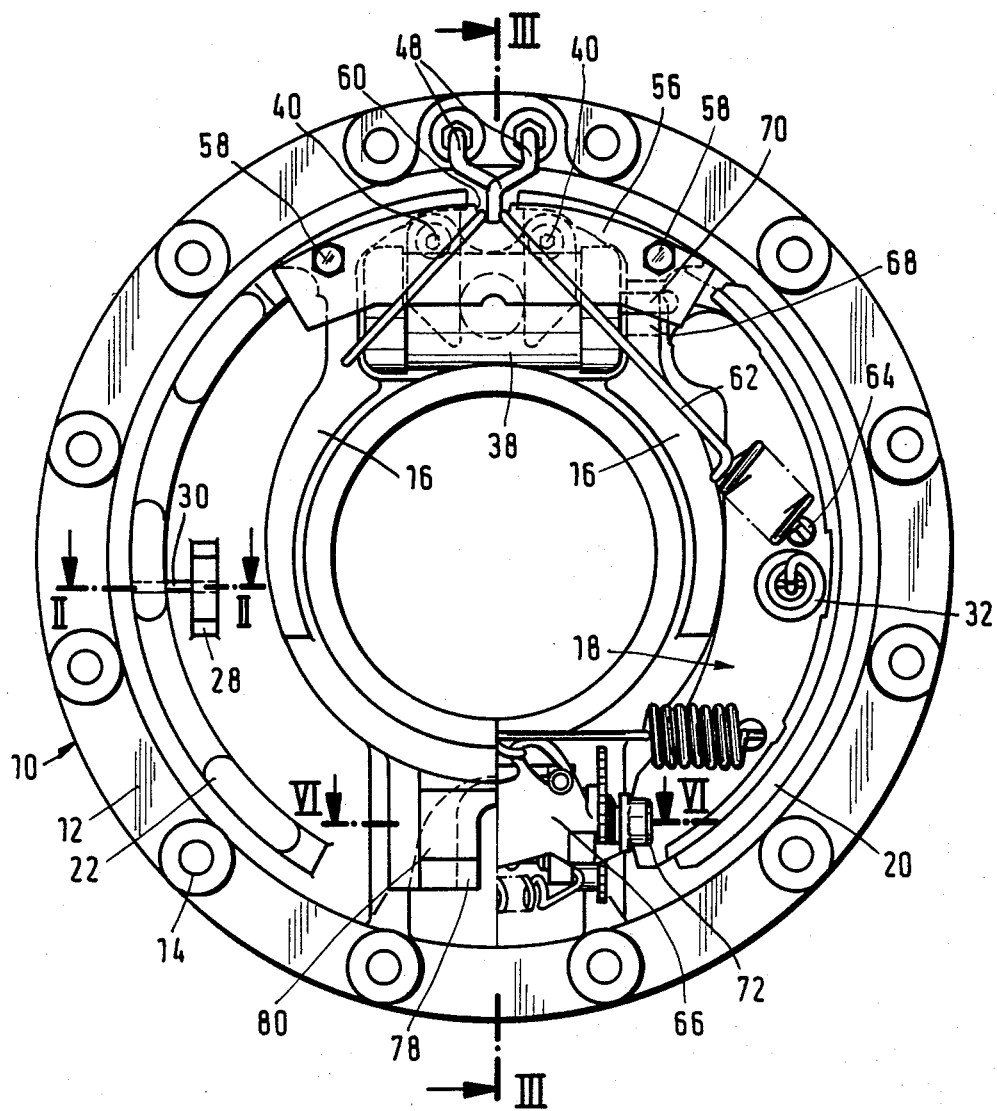
FIG. 1 shows a front view, partially broken away, of an axial gear cover constructed as brake carrier.
Figure 4:
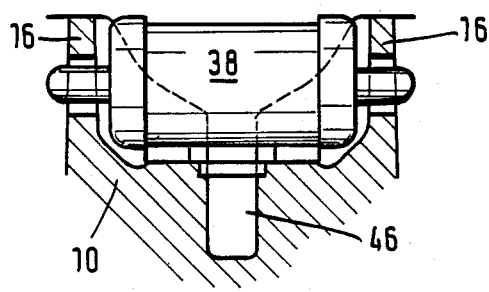
FIG. 4 is a plan view of the zone of the axial gear cover receiving the wheel cylinder.
Figure 5:
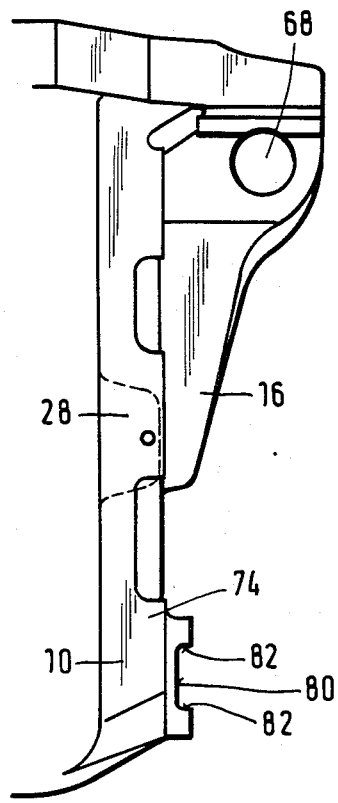
FIG. 5 is a side view of the zone of the axial gear cover constructed as a brake carrier, in which the brake elements are not yet assembled.

In FIG. 1, there is shown an oil-pressure servo brake, the brake carrier of which is formed by an especially constructed axial gear cover 10. Through this measure, it is possible to dispense with a separate brake carrier, which leads to a corresponding reduction of the installation space required. The axial gear cover 10 is provided in the zone of its circumferential flange 12 with numerous bores 14 arranged in an angular spacing, which serve for the reception of screws (not shown), in order to join the axial gear cover with the vehicle secure against turning.

Figure 2:
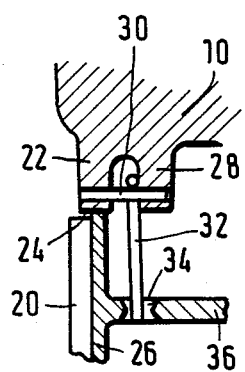
FIG. 2 is a section along the line II—II in FIG. 1.

With the axial gear cover 10, there is integrated a brake jaw bracing angle piece 16, on which there abut brake jaws 18 provided with a brake lining 20. The axial gear cover 10 is provided on its front side, further, with several straps 22 arranged in angular spacing from one another, the surfaces 24 of which lie in a plane. The two brake jaws 18 lie with their brake lining carrier 26 on the surfaces 24 of the straps 22. As is evident from FIGS. 1 and 2, the axial gear cover 10 is provided, beside the strap 22 bracing the middle zone of each brake lining carrier 26, with a projection 28. According to FIG. 2, through this projection 28 and the adjacent strap 22, there is thrust holding pin 30, on which there is suspended a spring 32. This spring 32 extends through an opening 34 of the strap 36 of the appertaining brake jaw 18, and it abuts on its outside of the strap 36, whereby the brake jaw 18 is held in engagement to slide on the axial gear cover 10.

Figure 3:
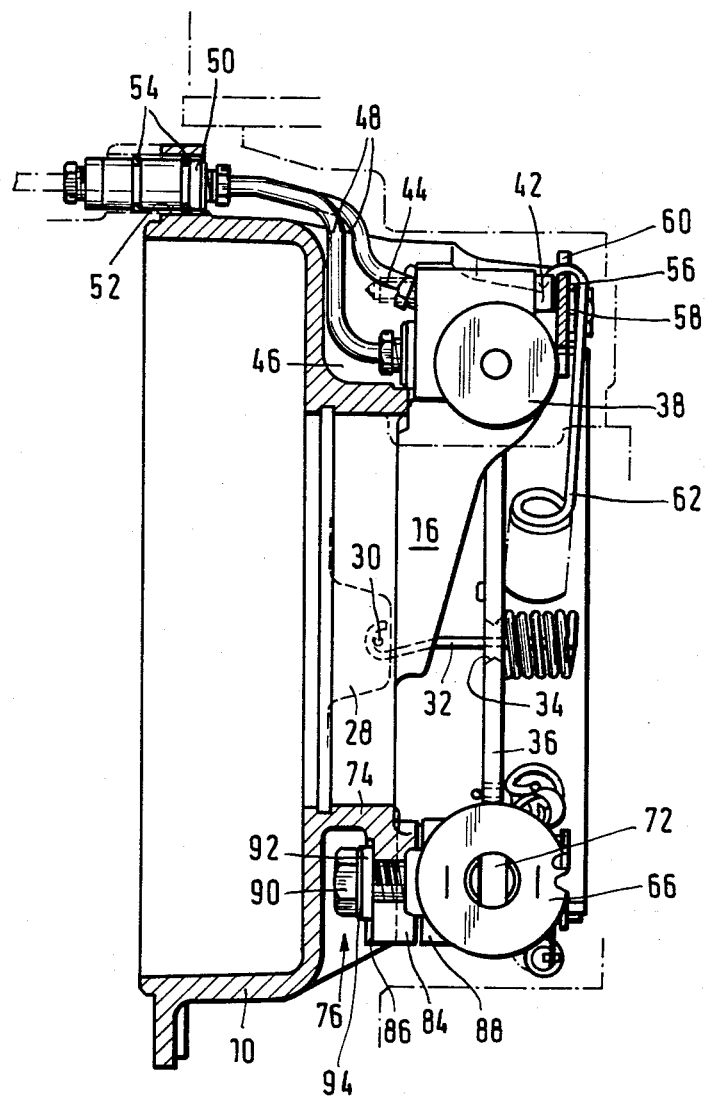
FIG. 3 is a section along the line III—III in FIG. 1.

The wheel cylinder 38 arranged on the upper zone of the axial gear cover 10 is provided with two bores 40 which are arranged, as seen from the middle of the brake, outside the axis of the wheel cylinder. The wheel cylinder 38 is fastened with two screws 42 to the axial gear cover 10, which are inserted in the bores 40 and screwed into threaded bores 44 of the axial gear cover 10. As is evident from FIG. 3, the brake jaw bracing angle piece 16 integrated with the axial gear cover 10 is divided in the middle in order to obtain a free space 46 which receives the hydraulic lines 48 leading to the wheel cylinder 38. For reasons of assembly, the hydraulic lines 48 are interrupted by tube nuts 50 which are arranged in the circumferential flange 12 of the axial gear cover 10. So that the hydraulic lines are not exposed to any bending strains in the vibrations arising, the tube nuts 50 are installed in the bores 52 of the circumferential flange 12 with play and held springably in each case by two O-rings 54. With the brake jaw bracing angle piece 16, there is joined by means of two screws 58 a plate 56 partially covering the wheel cylinder 38. The plate 56 is provided in the middle zone of its outer edge with a notch 60, into which there are hooked two restoring springs 62, the other end of which is inserted into an opening 64 of each strap 36 of the two brake jaws 18.

In the lower circumferential zone of the axial gear cover 10, there is arranged an automatic readjusting device 66. When the two brake jaws 18 through action of pressure on the wheel cylinder 38 are spread over the hydraulic lines 48, in which process the pressure bolts 70 extending through the bores 68 of the brake jaw bracing angle piece 16 act on the brake jaws 18, they act with their oppositely lying end on the two threaded bolts 72 of the readjusting device 66. Because of the cramped space relations, the fastening of the automatic readjusting device 66 to the axial gear cover 10 is specially constructed. As is evident from FIG. 3, the axial gear cover 10 is provided in the lower circumference with an integrated projection 74. In this projection 74, there is formed a pocket 76 opening outward, so that on the upper side of the projection 74 there is formed a bridge 78. Into the outer surface of this bridge 78, there is milled a groove 80 tangential in respect to the brake center, so that in the bridge 78 there are formed two tangential shoulders 82. Into the bridge 78, there is milled a radial slit 84 which is open toward its edge turned away from the brake center. The underside of the bridge 78 facing the pocket 76 is provided with a radial groove 86 which is somewhat wider than the radial slit 84. The width of the tangential groove 80 of the bridge 78 corresponds to the width of a rectangular slide piece 88 arranged on the readjusting device 66; the width of the radial groove 84 of the bridge 78 corresponds to the thickness of a fastening screw 90 screwed into the slide piece 88; and the width of the radial groove 86 is somewhat greater than the diameter of the shim 92 arranged on the fastening screw 90. For the assembling of the readjusting device, the fastening screw 90, with interposition of the shim 92 and of a spring plate 94, is screwed so far into the slide piece 88 of the readjusting device 66 so that the slide piece 88 can be brought beyond the shoulder 82 into the tangential groove 80. There the shaft of the fastening screw 90 is moved upward in the radial slit 84 of the groove. As soon as the slide piece 88 is arranged in the tangential groove 80 of the bridge 78, the fastening screw 90 can be tightened with the aid of a fixed spanner introduced into the pocket 76 and thereby be fastened to the readjusting device 66.

Figure 6:
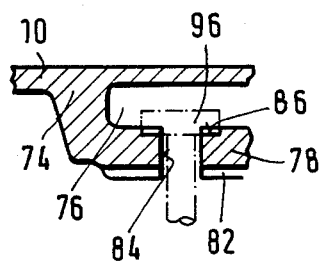
FIG. 6 is a section along the VI—VI of FIG. 1, which illustrates a production process.

For reasons of casing technology, it is appropriate if the mold used for the casing of the axial gear cover 10 is provided with a core in the zone of the pocket 76 and the bridge 78 is formed without interruption. After the casing of the axial gear cover, the core is removed and by means of a shaft milling tool the radial slit 84 is milled into the bridge 78, and then, as shown in FIG. 6, the radial groove 86 is cut into the radial groove 86 with a slit-milling tool 6. The tangential groove 80 is milled into the bridge 78 with a side-milling cutter.

What is claimed is:

1. Hydraulically operable internal shoe-drum brake for vehicles, especially stacking vehicles, in which the axles of the driven wheels are connected each with a corresponding axle gear which is provided with a cover (10) arranged secure against turning on the vehicle, said axle gear cover forming a brake carrier and having a circumferential zone, said brake comprising a wheel cylinder (38) fastened to the circumferential zone of axle gear cover (10), which wheel cylinder (38) is connected by hydraulic lines (48) with a pressure medium source, an automatic readjusting device (66) fastened to the circumferential zone (12) of the axle gear cover (10) lying opposite to the wheel cylinder (38), two brake jaws (18), the oppositely lying ends of which abut on the piston of the wheel cylinder and on the readjusting device (66), a brake-jaw bracing angle piece (16) fastened to the axle gear cover and supporting said brake jaws, and restoring springs (62) which engage on the brake jaws and on the axle gear cover (10).

2. Brake according to claim 1, characterized in that the axle gear cover (10) is provided with two threaded bores (44) which align with two bores (40) arranged in the wheel cylinder (38), through which bores screws (42) are screwable from outside into the threaded bores (44).

3. Brake according to claim 2, characterized in that the brake-jaw bracing angle piece (16) is integrated with the axle gear cover (10) and is divided in the middle, in order to form a free space (46) receiving the hydraulic lines (48).

4. Brake according to claim 3, characterized in that the hydraulic lines (48) are screwed together with tube nuts (50) which are springably borne in the circumferential zone (12) of the axle gear cover (10).

5. Brake according to claim 4, characterized in that the tube nuts (50) are installed with play bores (52) of the circumferential zone (12) of the axle gear cover (10) with interposition of O-rings (54).

6. Brake according to claim 2, characterized in that on the axle gear cover (10) there are arranged holding pins (30), on which there are suspendable draw springs (32) which engage on the brake jaws (18).

7. Brake according to any of claims 1 or 2, characterized in that the axle gear cover (10) is provided in the fastening zone of the readjusting device (66) with a pocket (76) open toward its circumferential surface, the upper side of which is covered by a bridge (78), and that in the bridge (78) there is arranged a radial slit (84) open to the circumferential surface of the axle gear cover (10), so that a fastening screw (90) screwed into the readjusting device (66) is movable into engagement with the bridge (78) as the screw head is moved radially inward in the pocket (76) and the screw shaft in the slit (84).

8. Brake according to claim 7, characterized in that the readjusting device (66) is provided with a slide piece (88), and that the bridge (78) is provided on the outside with a tangential groove (80) tightly receiving the slide piece (88).

9. Brake according to claim 1, characterized in that the brake jaws (18) include a strap (36) that is provided with an opening (34) through which there extends the draw spring (32) abutting on the outside of the strap (36) remote from said axle gear cover (10).

* * * * *